(12) United States Patent
Yamada et al.

(10) Patent No.: US 7,532,282 B2
(45) Date of Patent: May 12, 2009

(54) LCD DEVICE HAVING A SEMI-TRANSMISSION AREA WITH BUMP LAYER IN A REFLECTIVE PORTION THEREOF AND A TRANSMISSION PORTION HAVING A TRANSPARENT ELECTRODE WITH SPACER DISPOSED THEREON

(75) Inventors: Yoshitaka Yamada, Fukaya (JP); Hirokazu Morimoto, Fukaya (JP); Seiichi Sato, Okegawa (JP); Hiroyuki Kimura, Fukaya (JP); Tetsuya Iizuka, Saitama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 692 days.

(21) Appl. No.: 11/139,507

(22) Filed: May 31, 2005

(65) Prior Publication Data

US 2005/0280757 A1    Dec. 22, 2005

(30) Foreign Application Priority Data

Jun. 18, 2004   (JP)  ............................. 2004-180472
Nov. 26, 2004   (JP)  ............................. 2004-342725

(51) Int. Cl.
*G02F 1/1339* (2006.01)
(52) U.S. Cl. ...................................... 349/114; 349/155
(58) Field of Classification Search ................. 349/114, 349/155–157
See application file for complete search history.

(56) References Cited

U.S. PATENT DOCUMENTS 6,714,270 B2   3/2004   Seiki et al.
6,906,768 B1   6/2005   Kim et al.
7,286,204 B2 * 10/2007   Yang et al. ................... 349/155
2005/0280757 A1  12/2005   Yamada et al.

FOREIGN PATENT DOCUMENTS

| JP | 2001-201749 | 7/2001 |
| JP | 2002214624 A * | 7/2002 |
| JP | 2002-303863 | 10/2002 |
| KR | 2001-0073422 | 8/2001 |

OTHER PUBLICATIONS

U.S. Appl. No. 11/555,880, filed Nov. 2, 2006, Tago et al.
U.S. Appl. No. 12/102,286, filed Apr. 14, 2008, Fukuoka, et al.
U.S. Appl. No. 12/111,475, filed Apr. 29, 2008, Fukuoka, et al.

* cited by examiner

*Primary Examiner*—David Nelms
*Assistant Examiner*—John Heyman
(74) *Attorney, Agent, or Firm*—Oblon, Spivak, McClelland, Maier & Neustadt, P.C.

(57) ABSTRACT

In order to reduce the number of processes for manufacturing spacers and to prevent quality degradation resulting from a cell gap, a spacer 115 in a semi-transmission area 12 is formed outside of a region of a bump layer 118B. Thus, it is made possible to manufacture the spacer in the transmission region 11 and the spacer outside of the region of the bump layer in the same process. Accordingly, the number of processes can be reduced. Moreover, it is made possible to determine the cell gap in the semi-transmission area 12 by a single element of a spacer. Accordingly, precision degradation of the cell gap, which results from the bump layer, can be prevented, and high display quality can be obtained.

7 Claims, 7 Drawing Sheets

FIG. 5

| | LIQUID CRYSTAL DISPLAY DEVICE 1A | LIQUID CRYSTAL DISPLAY DEVICE 1B |
|---|---|---|
| NUMBER OF PROCESSES FOR FORMING SPACER | ONE PROCESS | TWO PROCESSES |
| CELL GAP OF TRANSMISSION PORTION 12A | 6±0.2 μm | 6±0.4 μm |
| CELL GAP OF REFLECTION PORTION 12B | 3±0.2 μm | 3±0.2 μm |
| LIGHT TRANSMISSIVITY IN SEMI-TRANSMISSION AREA 12 | ±20% | ±40% |
| CONTRAST RATIO IN SEMI-TRANSMISSION AREA 12 | ±20% | ±40% |

LCD DEVICE HAVING A SEMI-TRANSMISSION AREA WITH BUMP LAYER IN A REFLECTIVE PORTION THEREOF AND A TRANSMISSION PORTION HAVING A TRANSPARENT ELECTRODE WITH SPACER DISPOSED THEREON

CROSS-REFERENCE TO RELATED APPLICATIONS

This application is based upon and claims the benefit of priority from Japanese Patent Application No. 2004-180472 filed on Jun. 18, 2004 and No. 2004-342725 filed on Nov. 26, 2004; the entire contents of which are incorporated herein by reference.

BACKGROUND OF THE INVENTION

1. Field of the Invention

The present invention relates to a technology for preventing quality degradation of a liquid crystal display device, which results from a cell gap.

2. Description of the Related Art

As the information technology has developed tremendously in recent years, commercialization of a liquid crystal display device that is capable of high-definition display and is compact, lightweight and low power consumption has been desired also in the field of a portable terminal. As a liquid crystal display device meeting such a requirement, a reflective liquid crystal display device performing display by using external light as a light source is an odd-on favorite.

When being used outdoors during the daytime, the reflective liquid crystal display device can perform image display of which visibility is extremely high. Meanwhile, because the light source is not provided, it is difficult to brightly display an image in a dark place, and a use environment of the reflective liquid crystal display device is limited.

In this connection, a liquid crystal display device has been proposed, which includes a transmission area for transmitting light from the light source therethrough and using the light for the display, and a reflection area for reflecting the external light and using the external light for the display. This liquid crystal display device performs the image display by using the external light as the light source in the reflection area and using a backlight unit as the light source in the transmission area, thereby absorbing the limitations on the use environment.

Moreover, for example, in Japanese Patent Laid-Open Publication No. 2002-303863, a liquid crystal display device has been disclosed, which includes a semi-transmission area having a reflection portion and a transmission portion in each pixel, and a reflection area having only the reflection portion in each pixel. In this liquid crystal display device, the backlight unit is not required in the reflection area, and accordingly, power consumption can be reduced.

Meanwhile, a liquid crystal display device giving more importance to improvement of the visibility has also been proposed. Such a liquid crystal display device is an example that includes a semi-transmission area having both of a reflection portion and a transmission portion in each pixel, and a transmission area having only a transmission portion in each pixel.

According to the liquid crystal display device, the display areas are used properly depending on a type of image information such that a current time the like are displayed on the semi-transmission area and a picture image is displayed on the transmission area. In such a way, the visibility of the displayed image can be improved on the transmission area while absorbing the limitations on the use environment and reducing the power consumption.

FIG. 1 is a cross-sectional view showing a configuration of one pixel in a semi-transmission area of a conventional liquid crystal display device 1B. As shown in this drawing, this pixel includes a transmission portion 12A and a reflection portion 12B.

The liquid crystal display device 1B includes an array substrate 111 formed of transparent glass or the like as a material, plural signal lines and plural scan lines, which are not shown, are formed on the array substrate 111 so as to intersect each other, and a transparent insulating film 112 is further formed thereon. On the transparent insulating film 112, a transparent pixel electrode 113 formed of indium tin oxide (ITO) as a material is formed.

An opposite substrate 116 formed of transparent glass as a material is disposed so as to be opposite to the array substrate 111. On the opposite substrate 116, a color filter 117 corresponding to a color of the pixel is disposed. On the color filter layer, a transparent insulating film 118 is formed, and a transparent opposite electrode 119 formed of the ITO or the like as a material is formed thereon.

Between the array substrate 111 and the opposite substrate 116, a liquid crystal layer 114 formed of multi-domain vertical alignment (MVA) liquid crystal as a material is disposed.

In the reflection portion 12B, unevenness is formed on the transparent insulating film 112, and correspondingly thereto, unevenness is also formed on the pixel electrode 113. Moreover, on the pixel electrode 113, an opaque reflection electrode 113B for reflecting external light, which is formed of aluminum or the like as a material, is formed. Correspondingly to a shape of the pixel electrode 113, unevenness is also formed on the reflection electrode 113B.

Moreover, in order to perform the optimum display in the reflection portion 12B, a transparent bump layer 118B for narrowing a cell gap is formed on the transparent insulating film 118. Here, thickness T of the bump layer 118B is assumed to be approximately 3 μm. In a region where the bump layer 118B is formed, a columnar spacer 115B for constantly maintaining the cell gap is disposed.

A basic configuration of the above-described transparent area where each pixel has only the transmission portion is similar to that of the transmission portion 12A, but is different therefrom in including a spacer for constantly maintaining a distance between the substrates. Height H of the spacer is substantially equal to thickness of the liquid crystal layer 114 in the transmission portion 12A. Here, the height H of the spacer is assumed to be approximately 6 μm.

Owing to the bump layer 118B, the cell gap in the reflection portion 12B is made narrower than the cell gap in the transmission area and the transmission portion 12A by the thickness T of the bump layer 118B. Accordingly, height HB of the spacer 115B is lower than the height H of the spacer of the transmission area. Specifically, the height HB is set so as to establish a relationship: H≈T+HB. Here, the height HB is approximately 3 μm.

The height HB of the spacer 115B is lower than the height H of the spacer of the transmission area, and accordingly, the spacer 115B must be formed by a process different from a process for forming the spacer of the transmission area. Therefore, in the liquid crystal display device 1B, the number of manufacturing processes is increased, and there is a possibility to reduce yield.

Moreover, the cell gap of the reflection portion 12B is determined by two main elements, which are: the thickness of the bump layer 118B; and the height of the spacer 115B.

Specifically, the cell gap of the reflection portion 12B is not determined by a single main element, and accordingly, precision of the cell gap in the semi-transmission area is poor, and variations in characteristics are large. In addition, owing to such factors, there is a possibility that display unevenness may occur on the overall display area.

SUMMARY OF THE INVENTION

It is an object of the present invention to reduce the number of manufacturing processes of the spacers and to prevent the quality degradation resulting from the cell gap in the liquid crystal display device.

A feature of a liquid crystal display device according the present invention is in that the liquid crystal display device includes: an array substrate including a display area having a pixel on each intersection point of plural scan lines and plural signal lines; an opposite substrate disposed to be opposite to the array substrate with a liquid crystal layer sandwiched therebetween; a transmission area in which each pixel in the display area transmits light therethrough, thereby performing display; a semi-transmission area including both of a transmission portion in which each pixel in the display area performs transmission display, and a reflection portion for reflecting external light, thereby performing display; a spacer disposed for constantly maintaining a distance between the array substrate and the opposite substrate in the transmission area; a bump layer disposed in the reflection portion in each pixel of the semi-transmission area; and a spacer disposed to be outside of a region of the bump layer in the transmission portion in each pixel of the semi-transmission area.

According to the present invention, in the semi-transmission area, the spacer is disposed outside of the region of the bump layer, thus making it possible to manufacture the spacer in the transmission area and the spacer outside of the region of the bump layer in the same process. Accordingly, the number of processes can be reduced. Moreover, it is made possible to determine the cell gap in the semi-transmission area by a single element of a spacer. Accordingly, precision degradation of the cell gap, which results from the bump layer, can be prevented, and high display quality can be obtained.

BRIEF DESCRIPTION OF THE DRAWINGS

FIG. 5 is a table showing the number of processes for forming a spacer, precision of a cell gap by actual measurement and characteristic variations in each of the liquid crystal display device 1A of the embodiment and the conventional liquid crystal display device 1B.

DESCRIPTION OF THE EMBODIMENT

First Embodiment

Figure 1:
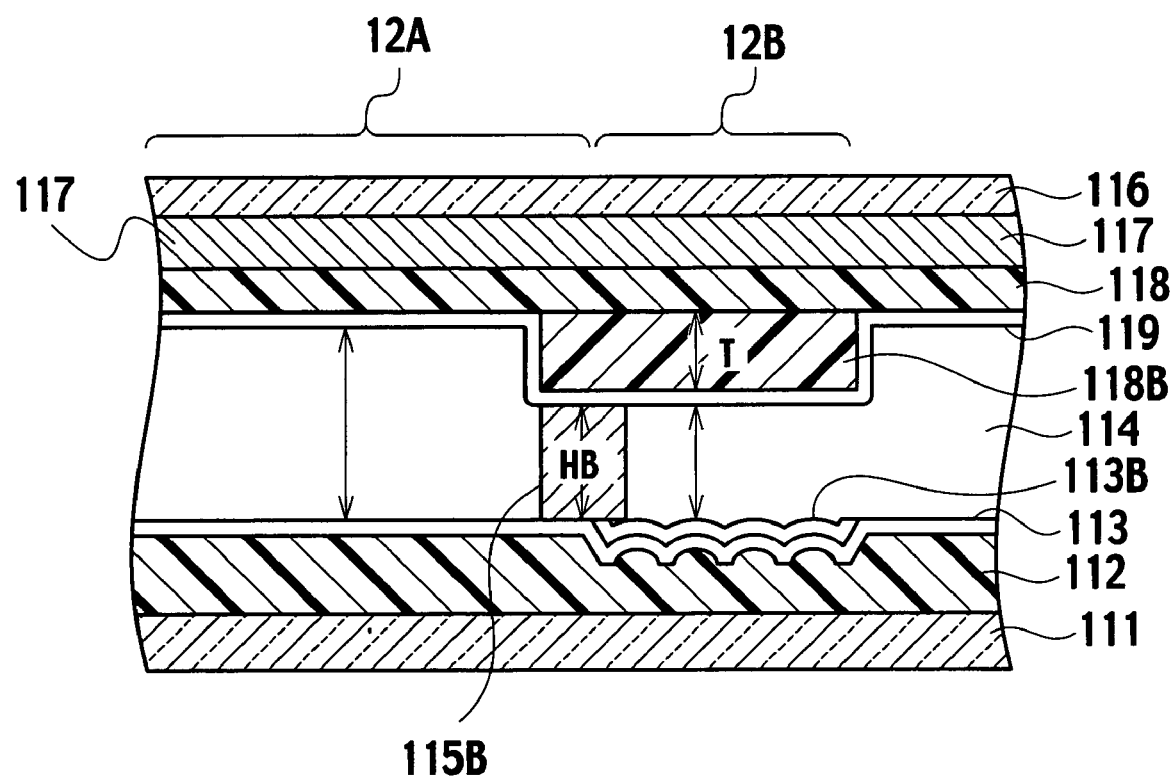
FIG. 1 is a cross-sectional view showing a configuration of one pixel in a semi-transmission area of a conventional liquid crystal display device.
Figure 2:
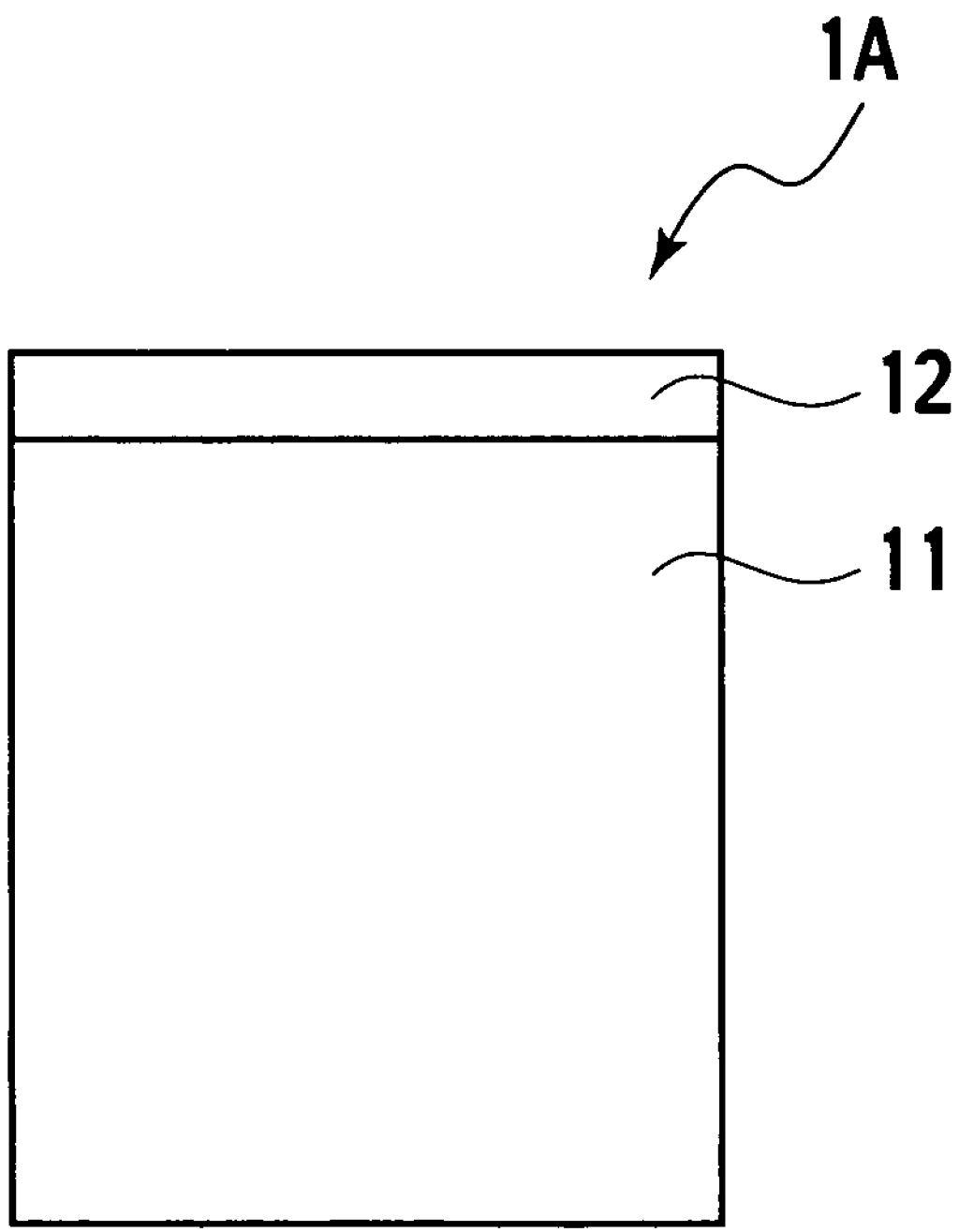
FIG. 2 is a plan view of a display area in a liquid crystal display device of an embodiment.

As shown in a plan view of FIG. 2, a display area in a liquid crystal display device 1A of this embodiment includes a transmission area 11, and a semi-transmission area 12. In the transmission area 11, each pixel transmits light from an unillustrated backlight unit therethrough, thereby performing transmission display. In the semi-transmission area 12, each pixel performs both of the transmission display as described above and reflection display in which external light is reflected. As the backlight unit, for example, a light emitting diode (LED), a fluorescent tube, an electro-luminescence (EL) element and the like are used. The liquid crystal display device 1A is described below on the assumption of being a color liquid crystal display device of an active matrix type.

A diagonal size of the display area when the liquid crystal display device 1A is used for a portable information terminal equipped with a telephone function is, for example, approximately 2.5 inches. The transmission area 11 is defined, for example, as a display area with a size of the quarter video graphics array (QVGA), in which rows in the horizontal scan direction are 240, and columns in the vertical scan direction are 320, and the semi-transmission area 12 is defined as a display area with a size of 240 rows×25 columns.

Figure 3:
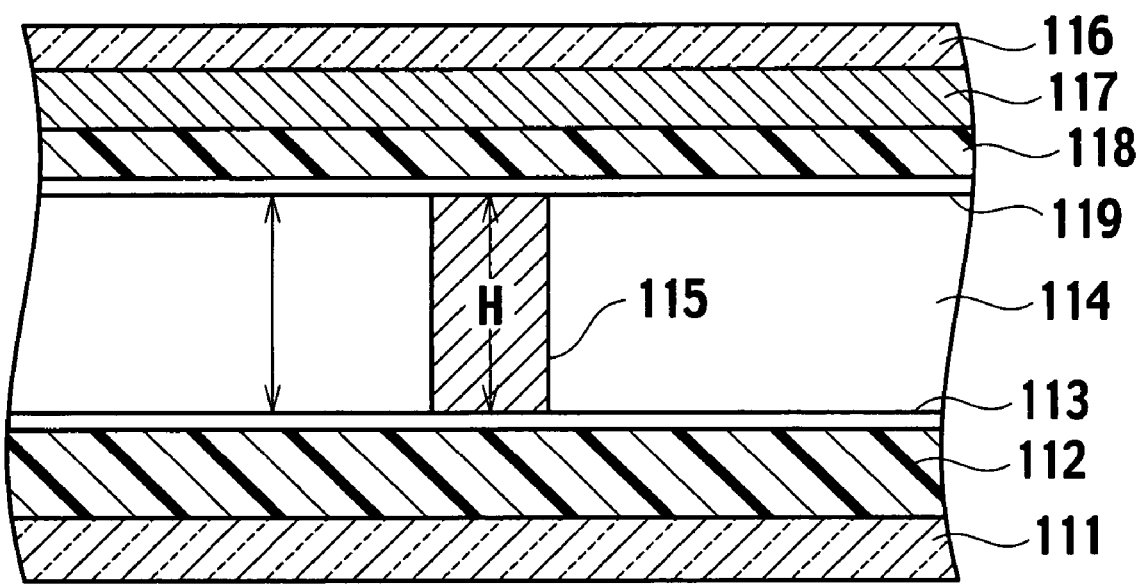
FIG. 3 is a cross-sectional view showing a configuration of a pixel in a transmission area of the liquid crystal display device of the embodiment.

As shown in a cross-sectional view of FIG. 3 for the transmission area 11, the liquid crystal display device 1A includes an array substrate 111 formed of transparent glass or the like as a material, plural signal lines and plural scan lines, which are not shown, are formed on the array substrate 111 so as to intersect each other, and a transparent insulating film 112 is further formed thereon. Moreover, a pixel is arranged on each of intersection points where the signal lines and the scan lines intersect each other, and for each pixel, an unillustrated switching element such as a thin film transistor (TFT) is formed.

In each pixel in the transmission area 11, a transparent pixel electrode 113 formed of indium tin oxide (ITO) or the like as a material is formed on a transparent insulating film 112. Moreover, an opposite substrate 116 formed of transparent glass or the like as a material is disposed so as to be opposite to the array substrate 111. Between the array substrate 111 and the opposite substrate 116, a liquid crystal layer 114 formed of multi-domain vertical alignment (MVA) liquid crystal or the like as a material, and a columnar spacer 115 for constantly maintaining thickness (cell gap) of the liquid crystal layer 114 in the transmission area 11, are disposed. Here, height H of the spacer 115 is assumed to be approximately 6 μm.

Moreover, in each pixel in the transmission area 11, a color filter 117 corresponding to a color of the pixel is disposed on the opposite substrate 116. A transparent insulating film 118 is formed so as to cover the color filter layer, and a transparent opposite electrode 119 formed of the ITO or the like as a material is formed so as to cover the transparent insulating layer 118.

Figure 4:
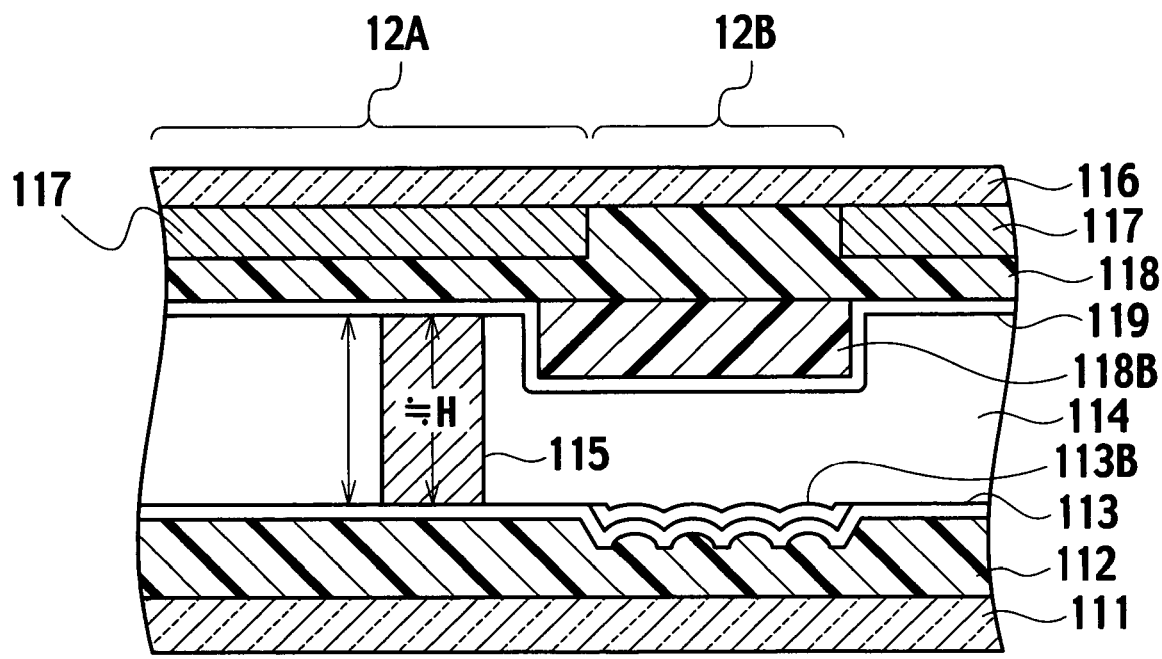
FIG. 4 is a cross-sectional view showing a configuration of the pixel in a semi-transmission area of the liquid crystal display device of the embodiment.

As shown in a cross-sectional view of FIG. 4 for the semi-transmission area 12, a pixel in the semi-transmission area 12 includes a transmission portion 12A and a reflection portion 12B. In the case of giving importance to the reflection display, an area ratio of the transmission portion 12A and the reflection portion 12B is set, for example, at 3:7, thereby widening the latter one.

In the transmission portion 12A, a color filter 117 corresponding to a color of the pixel is formed on the opposite substrate 116. A transparent insulating film 118 is formed so as to cover the color filter layer 117, and a transparent opposite electrode 119 formed of the ITO or the like as a material is formed so as to cover the transparent insulating film 118. Moreover, in the transmission portion 12A, a spacer with the same height as the height of the spacer 115 formed in the transmission area 11 is disposed (here, the spacer is denoted by the same numeral 115).

In the reflection portion 12B, unevenness is formed on the transparent insulating film 112, and correspondingly thereto, unevenness is also formed on the pixel electrode 113. Moreover, on the pixel electrode 113, an opaque reflection electrode 113B for reflecting the external light, which is formed of aluminum or the like as a material, is formed. Correspondingly to a shape of the pixel electrode 113, unevenness is also formed on the reflection electrode 113B.

Moreover, in the reflection portion 12B, the color filter 117 is not formed on the opposite substrate 116, and also on a portion concerned, the transparent insulating film 118 is formed. Furthermore, in order to perform the optimum display in the reflection portion 12B, a transparent bump layer 118B for narrowing the cell gap is formed on the transparent insulating film 118. Here, thickness T of the bump layer 118B is assumed to be approximately 3 μm. In a region of the bump layer 118B, the spacer is not disposed.

A display operation in the liquid crystal display device 1A with the configuration as described above is as follows. First, when the scan lines are driven to switch on the switching element, a video signal supplied from the signal line is written through the switching element to the pixel electrode 113 and the reflection electrode 113B. Meanwhile, a predetermined signal is supplied to the opposite electrode 119. In such a way, an electric field is applied to the liquid crystal layer 114. Moreover, field intensity is changed correspondingly to amplitude of the video signal, and the like, and transmissivity of light in the liquid crystal layer 114 is thus changed.

Meanwhile, when the light from the backlight unit transmits through the array substrate 111 and the like, and transmits through the liquid crystal layer 114, the light becomes the one with intensity corresponding to the light transmissivity of the liquid crystal layer 114. Then, the light generates color when transmitting through the color filter 117, and is emitted from the opposite substrate 116 to the outside.

Meanwhile, the external light transmits through the opposite substrate 116 and the like, further transmits through the liquid crystal layer 114, thereafter reflects on the reflection electrode 113B, and in this turn, transmits through the liquid crystal layer 114 in the reverse direction. During this while, the light becomes the light with the intensity corresponding to the light transmissivity of the liquid crystal layer 114. Then, the light is emitted from the opposite substrate 116 to the outside.

By the operation as described above, a picture image, body text of electronic mail, and the like, in which an amount of information is large, and for which bright display is desired, are displayed on the transmission area 11. Meanwhile, a current time, the presence of an incoming call, and the like, in which the amount of information is small, and for which display brightness equivalent to that of the transmission area 11 is not required, are displayed on the semi-transmission area 12.

In the liquid crystal display area 1A, the height of the spacer 115 in the transmission portion 12A in the pixel of the semi-transmission area 12 is approximately 6 μm, which is substantially the same as the height H of the spacer 115 of the transmission area 11. These spacers 115 are formed in the same manufacturing processes, for example, which form the spacers having coated with acrylic resin by photoetching, thus making it possible to reduce the number of manufacturing processes, and to achieve prevention of a reduction of yield and achieve a cost reduction of the liquid crystal display device.

Moreover, in the liquid crystal display device 1A, the cell gap of the semi-transmission area 12 is determined by a single main element that is the height of the spacers 115, and accordingly, precision of the cell gap is good, and characteristic variations are small. In addition, owing to such factors, display unevenness can be prevented from occurring in terms of the overall display area.

FIG. 5 is a table showing the number of processes for the spacer, the precision of the cell gap by actual measurement and the characteristic variations in each of the liquid crystal display device 1A of this embodiment and a conventional liquid crystal display device 1B.

While the number of processes for forming the spacers is two in the liquid crystal display device 1B, the number of processes in the liquid crystal display device 1A can be one. While the cell gap of the transmission portion 12A in the pixel was 6±0.4 μm in the liquid crystal display device 1B, such a result that the cell gap of the transmission portion 12A can be suppressed to 6±0.2 μm was obtained in the liquid crystal display device 1A.

Moreover, while the cell gap of the reflection portion 12B was 3±0.2 μm in the liquid crystal display device 1B, precision of the cell gap, which was 3±0.2 μm, was obtained in the liquid crystal display device 1A though the spacer was not provided in the reflection portion 12B. This is precision substantially equal to that in the liquid crystal display device 1B.

Moreover, while variations of the light transmissivity and a contrast ratio in the semi-transmission area 12 were individually ±40% in the liquid crystal display device 1B, such a result that these variations can be suppressed to ±20% was obtained in the liquid crystal display device 1A.

As described above, according to the liquid crystal display device of this embodiment, the spacer of the semi-transmission area 12 is formed outside of the region of the bump layer 118B, thus making it possible to manufacture the spacer of the transmission area 11 and the spacer outside of the region of the bump layer in the same process, and accordingly, the number of processes can be reduced. Furthermore, it is made possible to determine the cell gap in the semi-transmission area 12 by the single element of the spacer. Accordingly, degradation of the precision of the cell gap, which may result from the bump layer, can be prevented, and high display quality can be obtained.

According to this embodiment, the height of the spacer of the transmission area 11 and the height of the spacer outside of the region of transmission area 11 and the height of the spacer outside of the region of the bump layer 118B are made substantially the same, thus making it possible to form these spacers in the same process.

According to this embodiment, the spacer of the transmission area 11 and the spacer outside of the region of the bump layer 118B are formed in the same process, thus making it possible to reduce the number of processes, and in such a way, the cost reduction of the liquid crystal display device 1 is made possible.

According to this embodiment, the color filter is provided in at least one of the transmission area 11 and the transmission portion 12A in the pixel, and thus the color display is made possible in at least one of the transmission area 11 and the transmission portion 12A. Moreover, the color filter is eliminated from the reflection portion 12B, thus making it possible to brighten the display in the reflection portion 12B.

In addition, one or more openings are provided in the color filter, thus making it possible to brighten the transmission area 11 and the transmission portion 12A. As such openings, for example, one or more pin holes transmitting light therethrough are provided.

Note that the bump layer 118B may be provided on the transparent insulating film 112 on the array substrate 111 side instead on the transparent insulating film 118 of the opposite substrate 116. In addition, in the semi-transmission area 12 of the liquid crystal display device 1A, there may be a pixel in which the spacer 15 is not provided, and on the contrary, there may be a pixel in which a plurality of the spacers 15 are provided.

Second Embodiment

A basic configuration of a liquid crystal display device of this embodiment is similar to the one described in the first embodiment by using FIGS. 2 to 5. Here, the configuration of the color filter is described more specifically.

Also in this embodiment, for example, a display screen of a cellular phone is assumed. In addition, the semi-transmission area 12 is defined as a screen that shows just a receiving state of a radio wave and a remaining amount of a battery, for which color display is not required very much.

Figure 6:
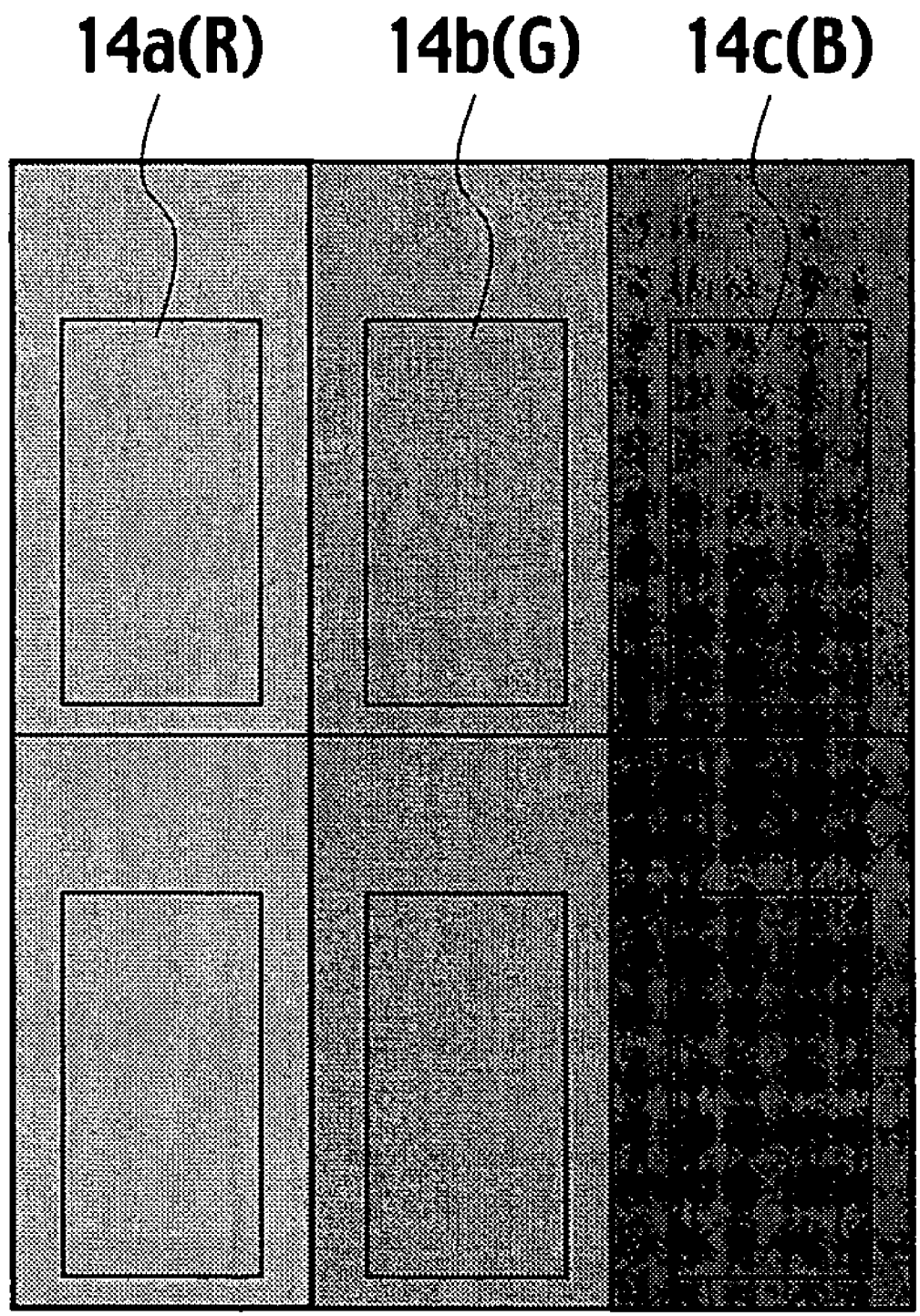
FIG. 6 is an enlarged plan view showing a configuration of the transmission area in the liquid crystal display device of the embodiment.
Figure 7:
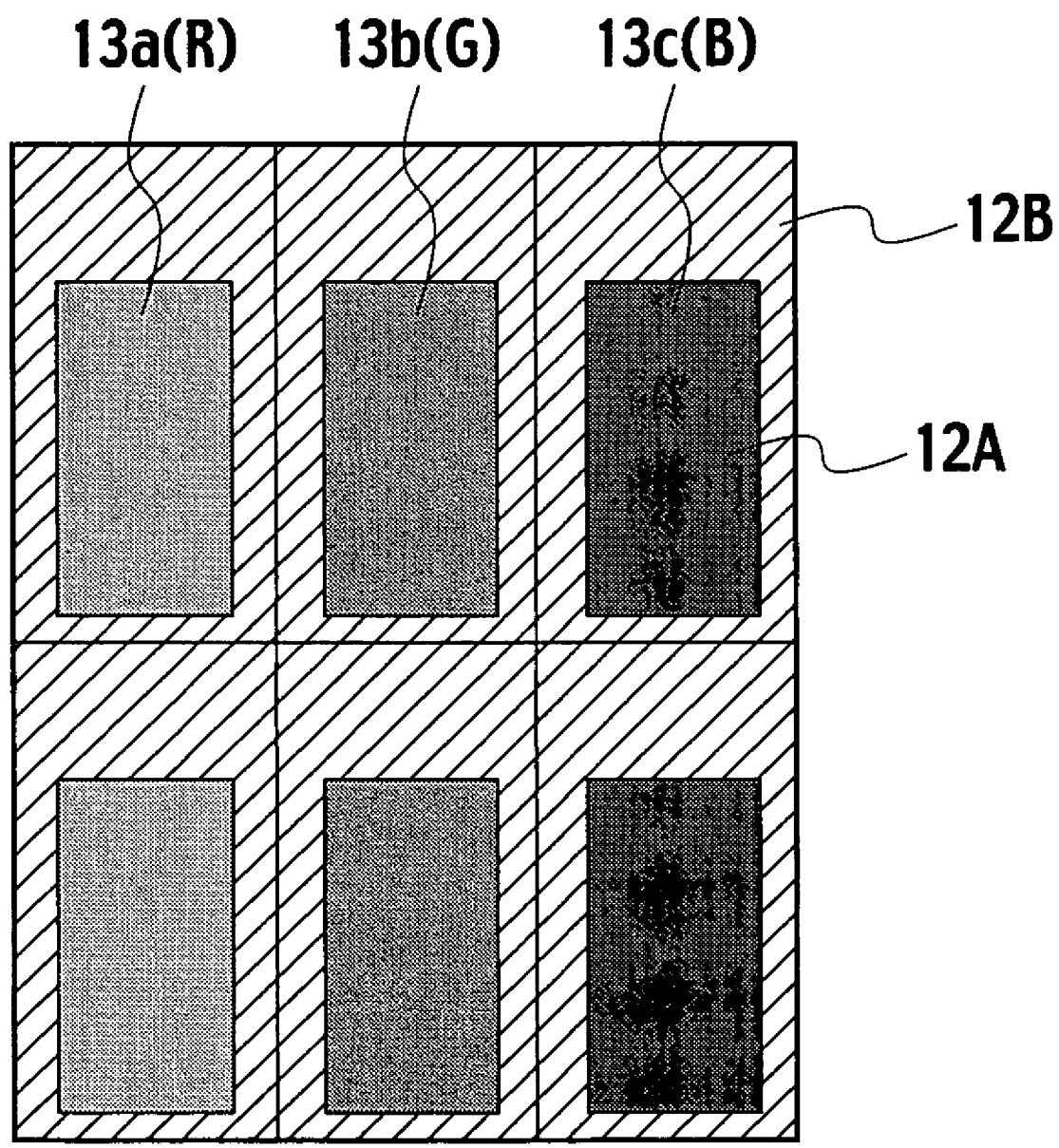
FIG. 7 is an enlarged plan view showing a configuration of the semi-transmission area in the liquid crystal display device of the embodiment.

FIG. 6 is an enlarged plan view showing a configuration of the transmission area 11, and FIG. 7 is an enlarged plan view showing a configuration of the semi-transmission area 12. As shown in FIG. 6, each pixel of the transmission area 11 is colored by any of a color filter 14a of red (R), a color filter 14b of green (G), and a color filter 14c of blue (B).

Meanwhile, in each pixel of the semi-transmission area 12, a ratio of an area of the color filter to the area of the pixel in the reflection portion 12B is smaller than a ratio of the area of the color filter to the area of the pixel in each pixel of the transmission area 11. In such a way, it becomes easy to transmit reflected light through the reflection portion 12B, and bright display is made possible.

As an example of a specific configuration, as shown in FIG. 7, in each pixel of the semi-transmission area 12, a configuration is adopted, in which any color filter of the red color filter 13a, the green color filter 13b, and the blue color filter 13c is disposed only in the transmission portion 12A, and the color filters are removed from the reflection portion 12B.

Hence, according to this embodiment, in the semi-transparent area 12 for which the color display is not required very much, the ratio of the area of the color filter to the area of the pixel in the reflection portion 12B in each pixel is made smaller than the ratio of the area of the color filter to the area of the pixel in each pixel of the transmission area 11, and thus, in the reflection portion 12B, higher reflectance is obtained for the amount of reduction in area of the color filter. Accordingly, the reflection display can be brightened.

In particular, when the color filters are removed from the reflection portion 12B, the light reflectance in the reflection portion 12B becomes the maximum, and accordingly, the brightest reflection display can be realized.

Note that the transmission area 11 may be replaced by the semi-transmission area in which each pixel includes both of the reflection portion and the transmission portion.

What is claimed is:

1. A liquid crystal display device, comprising:
an array substrate including a display area having a pixel on each intersection point of plural scan lines and plural signal lines;
an opposite substrate disposed to be opposite to the array substrate with a liquid crystal layer sandwiched therebetween;
a transmission area in which each pixel having a transparent electrode in the display area transmits light therethrough, thereby performing display;
a semi-transmission area including both of a transmission portion in which each pixel in the display area performs transmission display, and a reflection portion for reflecting external light, thereby performing display;
a spacer disposed for constantly maintaining a distance between the array substrate and the opposite substrate in the transmission area;
a bump layer disposed in the reflection portion in each pixel of the semi-transmission area; and
a spacer disposed to be outside of a region of the bump layer on the transparent electrode in the transmission portion in each pixel of the semi-transmission area.

2. The liquid crystal display device according to claim 1, wherein height of the spacer in the transmission area and height of the spacer outside of the region of the bump layer are substantially the same.

3. The liquid crystal display device according to claim 1, wherein the spacer of the transmission area and the spacer outside of the region of the bump layer are formed by the same manufacturing process.

4. The liquid crystal display device according to claim 1, wherein the bump layer is formed on either the array substrate or the opposite substrate.

5. A liquid crystal display device, comprising:
an array substrate including a display area having a pixel on each intersection point of plural scan lines and plural signal lines;
an opposite substrate disposed to be opposite to the array substrate with a liquid crystal layer sandwiched therebetween;
a transmission area in which each pixel in the display area transmits light therethrough, thereby performing display;
a semi-transmission area including both of a transmission portion in which each pixel in the display area performs transmission display, and a reflection portion for reflecting external light, thereby performing display;
a spacer disposed for constantly maintaining a distance between the array substrate and the opposite substrate in the transmission area;
a bump layer disposed in the reflection portion in each pixel of the semi-transmission area; and
a spacer disposed to be outside of a region of the bump layer in the transmission portion in each pixel of the semi-transmission area;
wherein a ratio of an area of a color filter to an area of the pixel in the reflection portion in each pixel of the semi-transmission area is smaller than a ratio of an area of a color filter to an area of the pixel in each pixel of the transmission area.

6. The liquid crystal display device according to claim 5, wherein the color filter is disposed on at least one of the transmission area and the transmission portion, and the color filter is eliminated from the reflection portion.

7. The liquid crystal display device according to claim 5, wherein the color filter includes one or more openings.

* * * * *